Figure 1:
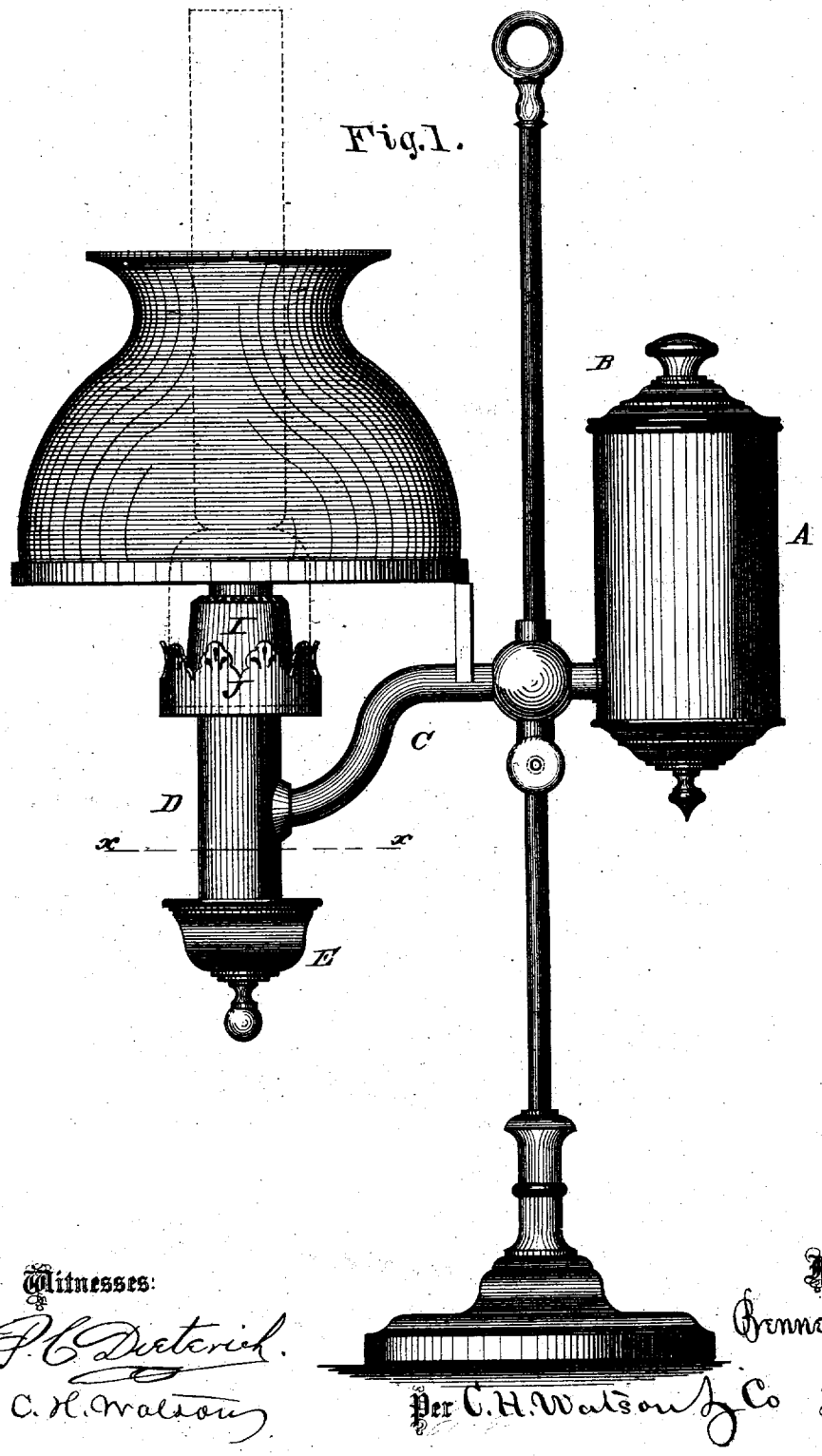

2 Sheets—Sheet 1.

B. B. SCHNEIDER.

Lamp.

No. 8,250. Reissued May 21, 1878.

Witnesses:

P. C. Dieterich.

C. H. Watson

Inventor:

Bennett B. Schneider

Per C. H. Watson & Co Attorneys.

N. PETERS, PHOTO-LITHOGRAPHER, WASHINGTON, D. C.

B. B. SCHNEIDER.

Lamp.

No. 8,250. Reissued May 21, 1878.

Witnesses:

P. C. Dieterich

C. H. Watson

Inventor:

Bennett B. Schneider

Per C. H. Watson & Co. Attorneys.

N. PETERS, PHOTO-LITHOGRAPHER, WASHINGTON, D. C.

UNITED STATES PATENT OFFICE.

BENNETT B. SCHNEIDER, OF NEW YORK, N. Y.

IMPROVEMENT IN LAMPS.

Specification forming part of Letters Patent No. 102,163, dated April 19, 1870; Reissue No. 6,355, dated March 30, 1875; Reissue No. 8,250, dated May 21, 1878; application filed April 27, 1878.

*To all whom it may concern:*

Be it known that I, BENNETT B. SCHNEIDER, of New York, in the county of New York and State of New York, have invented certain new and useful Improvements in Lamps; and I do hereby declare that the following is a full, clear, and exact description thereof, that will enable others skilled in the art to which it appertains to make and use the same, reference being had to the accompanying drawings, and to the letters of reference marked thereon, which form a part of this specification.

One part of this invention relates particularly to that kind of lamp which has an oil-reservoir with a valve in the bottom, and is placed in a case or receiver, in which it is supported at a level higher than the burner.

The object of this part of the invention is to provide for positively closing the reservoir by means of its valve in such manner that the reservoir, after it has been removed from its case and filled with oil in an inverted position, may be turned over and replaced in the shell without danger of spilling the oil, and without liability to force out the oil through the burner in such a manner as to produce an overflow, and that when the reservoir is in its place the valve may be easily opened to permit the flow of oil to the burner, or closed to cut off the supply from the burner, and thereby to prevent overflow when the lamp is not in use.

This part of the invention consists in the combination, with the reservoir and case, of a valve fitted to the bottom of the reservoir, and which may be opened and closed by turning the reservoir in the case, and in means of effecting the opening and closing by such turning of the reservoir.

The invention also consists in means for locking the reservoir or fount and the outer case together by means of a locking device.

Another part of the invention relates to the Argand burners commonly used in lamps of the class hereinbefore mentioned.

One of my improvements in such burners consists of the simplification of their construction by uniting the deflector at its top directly to the tube which immediately surrounds the wick (and which is revolved or turned to effect the adjustment of the wick) in such a manner that the said tube, the deflector, and the chimney-gallery form but a single piece.

Another feature consists in strengthening and protecting with strips of metal the edges of the slot provided in the outside wick-tube for the reception of the spur of the wick-carrier.

Another feature consists in providing in the top of the deflector, or the piece which unites it to the top of the said outside wick-tube, a series of openings close to the said tube, in such manner as to cause any oil which may drip from the burner to flow into the tube or shell containing the aforesaid wick-tube or the cup provided at the bottom of the same.

Figure 3:
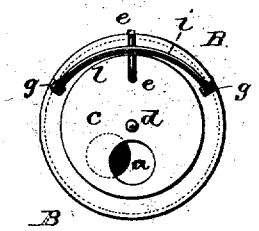
Figure 2:
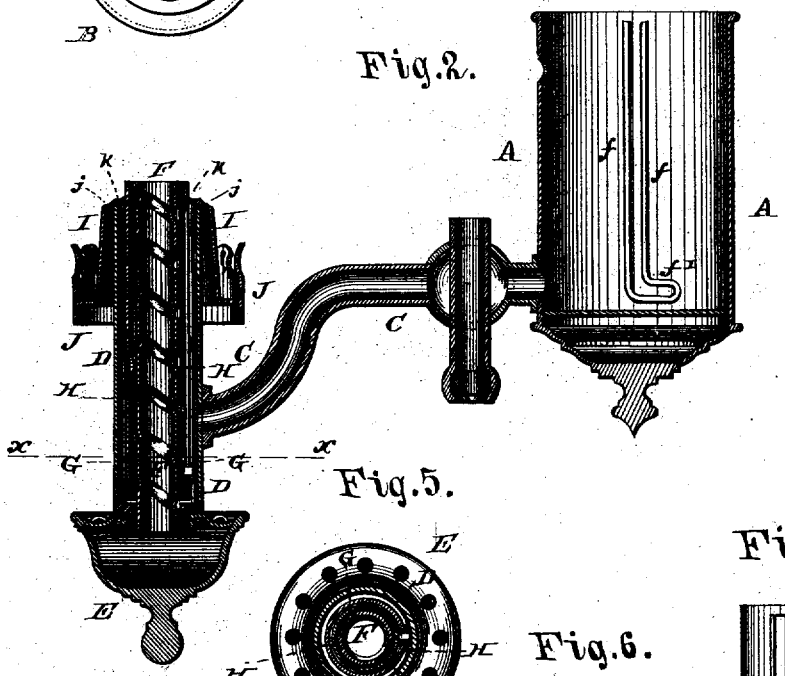
Figure 5:
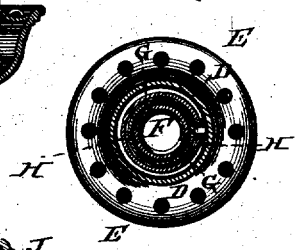
Figure 7:
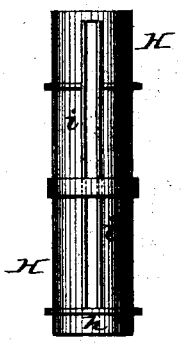
Figure 6:
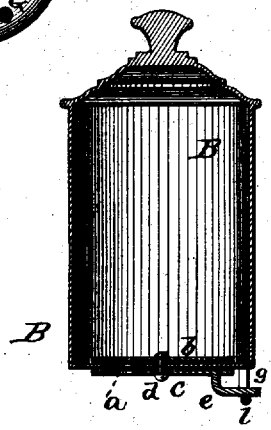
Figure 4:
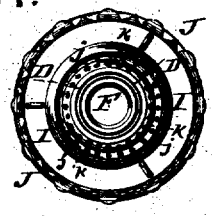

In the accompanying drawing, Figure 1 is a side view of a lamp embodying my invention. Fig. 2 is a vertical section, in detail, on a plane parallel to Fig. 1, showing the burner and the shell which contains the reservoir. Fig. 3 is a bottom view of the oil-reservoir, showing the disk forming part of the cut-off or valve of the same. Fig. 4 is a top view of the burner. Fig. 5 is a longitudinal section taken through the wick-tubes on the plane of the dotted line *x x*, Figs. 1 and 2. Fig. 6 is a vertical central section of the oil-reservoir, and Fig. 7 is a side view of the outside wick-tube, the deflector being omitted.

Similar letters of reference indicate corresponding parts in the several figures.

A designates a case or receiver for holding the oil-reservoir. This receiver is of cylindrical form, and it is provided internally with a groove or passage, which is open at the upper end, extends downward along the inside of the said receiver, and terminates at a suitable distance from the bottom thereof in a horizontal direction around the receiver, having a closed outer end.

In the example of my invention illustrated in the drawing, this passage is formed by securing inside the receiver A a wire, *f*, bent so as to confine or bound a space which is of the general shape of the letter L, (see Fig. 2,) and isopen at the top, but closed at the outer end of its lower limb or extension.

C designates a supply-pipe leading from the receiver A to the tube or pipe which contains the wick-tube. This pipe is shown as being provided with a slide and a set-screw, whereby it is adapted to move up and down, and be secured in any desirable position on a suitable standard or stem. B designates the reservoir. It is of cylindric form, and provided with a valve, which is capable of being operated in a positive manner by means of turning the reservoir within the receiver A. This valve is represented as consisting of a pair of disks, applied, one, *b*, to the upper side of the plate which forms the bottom of the reservoir B, and the other, *c*, to its lower side. These two disks are rigidly secured to a pin or pivot, *d*, which is free to turn in the bottom of the reservoir. In these disks are holes or openings, which correspond in size and in their distance from the pin *d* to a hole or opening, *a*, in the bottom of the reservoir.

By turning the disks so that their said openings are brought into line with the hole *a* the reservoir may be opened for filling it, or for permitting the flow of oil from it into the receiver A. By turning the disk so that the said opening is shifted out of line with the hole *a* the bottom of the reservoir is closed, and the flow of oil from it consequently prevented.

On the bottom of the disk *c* is a rod, arm, or projection, *e*, which extends slightly beyond the periphery of the reservoir B, and serves as a means by which to shift the valve *b c*. For the sake of strength, this arm may extend through an arc-shaped slot in the bottom of the reservoir, and be secured to the disk *b* as well as to the disk *c*.

To prevent this arm *e* from moving unnecessarily far, stops *g g* may be arranged, one on each side of it, on the reservoir B, and to prevent the said arm from being wrenched off, a bar, *l*, may be arranged under it and secured to the stops *g g*.

The reservoir B may be filled through the opening *a* when it is turned upside down and its valve opened.

The reservoir is placed in the receiver A, so that the end of the valve-operating arm *e* enters and passes down a vertical groove or passage, *f f'*, provided therein. This groove or passage is represented as formed by soldering two wires to the interior of the receiver. When, after placing the reservoir in the receiver, it is desirable to open the valve and permit the flow of oil to the wick-tube, the reservoir is turned, so as to cause the valve-operating arm *e* to enter the transverse extension *f'* of the groove *f f* and abut against the closed end thereof, and then the continued shifting of the reservoir opens the valve by bringing its hole *a* into line with the openings of the valve *b c*, and the oil is free to flow out; but until the reservoir is thus turned no oil can escape from it, and hence none is spilled in turning over the reservoir right-side up after filling, and none is allowed to pass into the receiver A and be expelled therefrom and caused to overflow the burner by the piston-like operation of the reservoir produced by the act of inserting it into the receiver.

Fitting in the said transverse extension *f'* of the passage *f f*, the arm *e* precludes the removal of the reservoir by lifting it upward, and renders it necessary to first turn the reservoir in order to cause the arm to enter the main groove. This movement being necessary, the person endeavoring to remove the reservoir will be reminded to turn the reservoir sufficiently far to effect the closing of its valve before lifting it out, and thereby obviate the spilling of any remnant of oil which may be in the reservoir. When the lamp is extinguished the opening *a* in the bottom of the reservoir should be closed by turning the reservoir, as just described, while the arm *e* is bearing against the stop formed by the side of the main passage *f* farthest from the transverse extension thereof.

D designates an upright shell or tube, which is arranged at the end of the supply-pipe C, and contains the wick-tube and its appurtenances. This tube D is constructed in the usual manner, and at the bottom is provided with a cup, E, for receiving oil, which may drip down the outside of the said tube from the burner. It also contains an inner spiral grooved or threaded tube, F, upon which fits an ordinary spirally-threaded wick-carrier, G.

H designates the outside wick-tube, which is shown as being formed of sheet metal, and provided with the usual slot or opening for the reception of the spur or tongue by which said wick-carrier G is turned. Strips *i i* of sheet metal are folded over and secured to the edges of this slot, and the tube is braced at intervals in its length by surrounding rings, the lower of which is provided with an outwardly-extending flange, adapted to fit snugly in the tube D and steady the said wick-tube therein.

I designates a deflector, which is represented as being of about the usual form, and provided with a chimney gallery or holder, J; but, instead of being secured by arms to a separate short tube surrounding the tube D, and connected detachably thereto, the deflector is represented as being permanently attached to the outside wick-tube H, near its top, by an inwardly-projecting portion of the said deflector or flange or connecting-piece attached to said tube.

In practice, probably, a good mode of construction will be to contract the metal at the top of the deflector, so as to make it fit snugly around the upper end of the tube H, and then solder it thereto. It is, however, necessary, or at least preferable, to form a row of perforations, *j j*, in that portion of the metal which connects the deflector proper to the tube H, to allow air to pass upward at that point from the inside of the deflector, and preferably to depress the metal inside this row of perforations *j j*, so as to form an annular gutter, which, if perforated with holes *k k*, will return to the inside of the tube D any oil which may drip outside of the wick along the exterior of the tube H.

I am aware that a similar means for fastening has been applied to the contracted lower end of a reservoir, whereby it was adapted to be locked in a case adapted to such contracted portion, with a valve interposed between the lower extension of the reservoir, with a double wall for the outer case, said outer case having an enlarged inner portion near the bottom necessitated by having the valve open upon the side; but this forms no part of my invention, as in my invention, the valve being in the bottom of the reservoir, the double wall is obviated; and in my invention the reservoir is inclosed within the case, which is desirable, as in case of accident there can be no overflow, as the outer case would hold the oil.

Having thus fully described my invention, what I claim as new, and desire to secure by Letters Patent, is—

1. In a lamp, a removable fount and an outer case inclosing the fount, in combination with a device for securing the fount and outer case together, for the purpose set forth.

2. The combination of a removable fount and outer case inclosing the fount with a locking device and valve in bottom of fount, whereby the fount and outer case are locked together and the valve opened by a movement of the fount, for the purpose set forth.

3. The combination, with the bottom plate of the reservoir B, having an aperture therein for the admission and escape of oil, of a valve having a corresponding aperture, and attached to the bottom of the reservoir to be capable of turning thereon, substantially as herein described.

4. The combination of the reservoir B, a turning valve attached to its bottom, an arm, *e*, provided on such valve, and a receiver, A, having a groove or passage in its inner side receiving said arm, substantially as and for the purpose herein described.

5. The combination, with the reservoir B, valve *b* or *c*, furnished with an arm, *e*, of a receiver, A, provided in its inner side with a passage, terminating in a transverse extension, substantially as herein set forth, whereby the reservoir may be secured in the said receiver against removal by simply lifting it out.

6. The plate or sheet of metal which unites the deflector I to the tube H, constructed with a series of apertures in close contiguity with the tube H, substantially as set forth.

7. The combination of the tube H and strips of metal *i i*, substantially as set forth.

In testimony that I claim the foregoing I have hereunto set my hand.

BENNETT B. SCHNEIDER.

Witnesses:
WM. H. TRIPP,
EDWIN S. DRAKE.